United States Patent
Okuyama (10) Patent No.: US 7,023,831 B2
(45) Date of Patent: Apr. 4, 2006

(54) CDMA MOBILE COMMUNICATIONS APPARATUS AND BASE STATION DETECTING METHOD USED THEREFOR

(75) Inventor: Toshiyuki Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 827 days.

(21) Appl. No.: 09/985,298

(22) Filed: Nov. 2, 2001

(65) Prior Publication Data

US 2002/0064146 A1 May 30, 2002

(30) Foreign Application Priority Data

Nov. 29, 2000 (JP) .............................. 2000-362052

(51) Int. Cl.
*H04B 7/216* (2006.01)
(52) U.S. Cl. ...................... 370/342; 370/335; 370/503; 375/149
(58) Field of Classification Search ................ 370/328, 370/329, 335, 342, 345, 350, 441, 458, 479, 370/503; 375/140, 149, 150, 515
See application file for complete search history.

(56) References Cited

U.S. PATENT DOCUMENTS

| 6,459,402 B1 * | 10/2002 | Tsunehara et al. ............ 342/47 |
| 6,625,200 B1 * | 9/2003 | Dent .......................... 375/142 |
| 6,804,215 B1 * | 10/2004 | Tanoue ....................... 370/335 |

* cited by examiner

*Primary Examiner*—Steven H D Nguyen
(74) *Attorney, Agent, or Firm*—Foley & Lardner LLP (57) ABSTRACT

To provide a CDMA mobile communications apparatus which can enhance a detection probability of a base station received with low power. A first threshold determination unit selects a peak correlation value output from a slot synchronizing unit based on a predetermined first threshold T1. A second threshold determination unit selects the peak correlation value selected by the first threshold determination unit based on the predetermined second threshold T2. A first storage unit and a second storage unit hold slot timing corresponding to the peak correlation value selected by the second threshold determination unit. The slot timing selection unit appropriately selects the slot timing held in the first storage unit and the second storage unit, and sequentially transmits the slot timing to a frame synchronization/code group identifying unit and a Scrambling Code identifying unit.

13 Claims, 9 Drawing Sheets

PRIOR ART

CDMA MOBILE COMMUNICATIONS APPARATUS AND BASE STATION DETECTING METHOD USED THEREFOR

BACKGROUND OF THE INVENTION

1. Field of the Invention

The present invention relates to a CDMA mobile communications apparatus and a base station detecting method used for the apparatus, and more specifically to a procedure (cell search) for use by the CDMA (Code Division Multiple Access) mobile communications apparatus detecting a base station which is a direct connection partner.

2. Description of the Related Art

Conventionally, in the CDMA mobile communications, in order to synchronize the CDMA mobile communications apparatus (hereinafter referred to as a mobile unit) with the base station, there are a system and a sub-system of using three physical channels for constant transmission from the base station, that is, pSCH (Primary Synchronization Channel) and the sSCH (Secondary Synchronization Channel), and the CPICH (Common Pilot Channel).

These systems are described in the Standard Specifications TS25.211, TS25.213, and TS25.214 by the 3GPP (3rd Generation Partnership Project) which is a standard specification association of the CDMA mobile communications.

Figure 5:
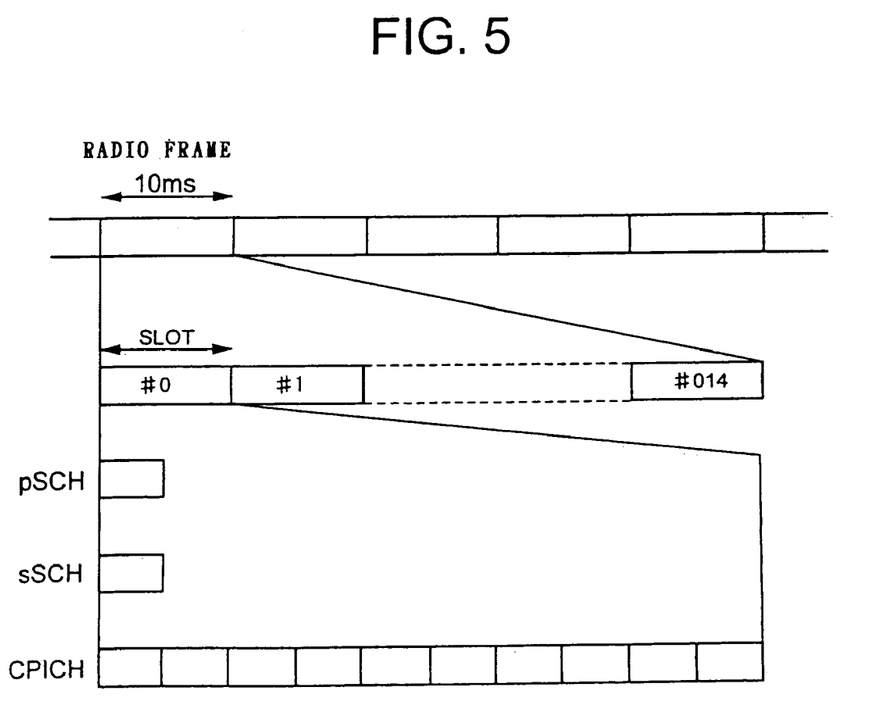
FIG. 5 shows a structure of a physical channel described in the standard specification TS25.211.

The structure of the physical channel shown in the standard specification TS25.211 has a radio frame of 10 ms as a basic unit, and one frame is formed by 15 slots as shown in FIG. 5. The symbol rate of the physical channels pSCH, sSCH, and CPICH is 10 per slot, but the pSCH and sSCH are assigned only to the leading symbol period of a slot.

The pSCH is spread by a spread code PSC (Primary Synchronization Code) commonly used in all base stations. The sSCH is spread by 16 types of SSC (Secondary Synchronization Code) assigned to each slot according to the unique sequence corresponding to 64 code groups to which the Scrambling Code assigned to each base station described later belongs.

The CPICH is spread by the Scrambling Code assigned to each base station. The other physical channels excluding the pSCH and sSCH transmitted from a base station are spread by the same Scrambling Code, and these physical channels are spread by a chanelization code assigned to each physical channel. However, the explanation is omitted here.

A common base station detecting method using the above mentioned three physical channels is described in the standard specification TS25.214. A base station detecting process is performed by detecting a frame transmission timing of a base station with a chip precision which is a spread unit, and by further detecting a Scrambling Code which is used at the base station. The process is performed in three steps of 'slot synchronization', 'frame synchronization/code group identification', and 'Scrambling Code identification'.

These steps will be briefly explained below. First, in the 'slot synchronization' step (hereinafter referred to as step #1), in the timing of all chips in 1 slot period, a correlation operation corresponding to the spread code PSC is performed, and the profile of the correlation power value for the timing is obtained. When the pSCH transmission timing of the base station matches the timing of the correlation operation of the mobile unit, a large correlation value appears in the profile.

Commonly, a digital matched filter having the spread code PSC as a filter coefficient is used in the correlation operation. When the reception base band signal of the mobile unit is input into the matched filter, a sharp peak is output at the timing of the pSCH matching the filter coefficient. By detecting the peak, the synchronization is obtained with the transmission timing of the pSCH, that is, the slot timing.

In the 'frame synchronization/code group identification' step (hereinafter referred to as step #2), at the synchronous slot timing in step #1, correlation operations of 16 types are performed. Each SSC correlation value is obtained over a plurality of slots, the correlation values are accumulated according to 64 SSC sequences of the SSC, and the code group is identified in order from the highest accumulation value. Furthermore, a frame can be synchronized from the sequence of the SSC.

In the 'Scrambling Code identification' step (hereinafter referred to as step #3), at the frame timing synchronizing in step #2, a correlation operation for 8 Scrambling Codes belonging to the code group identified in step #2 is performed, and the Scrambling Code is identified in order from the highest correlation value.

When transmission signals of a plurality of base stations are received by the mobile unit at different timing, the correlation value profile obtained in step #1 shows a plurality of peaks corresponding to the timing and the received power. Therefore, on each of the plurality of peaks obtained in step #1, the processes in steps #2 and #3 are repeatedly performed, thereby detecting a plurality of base stations.

Figure 6:
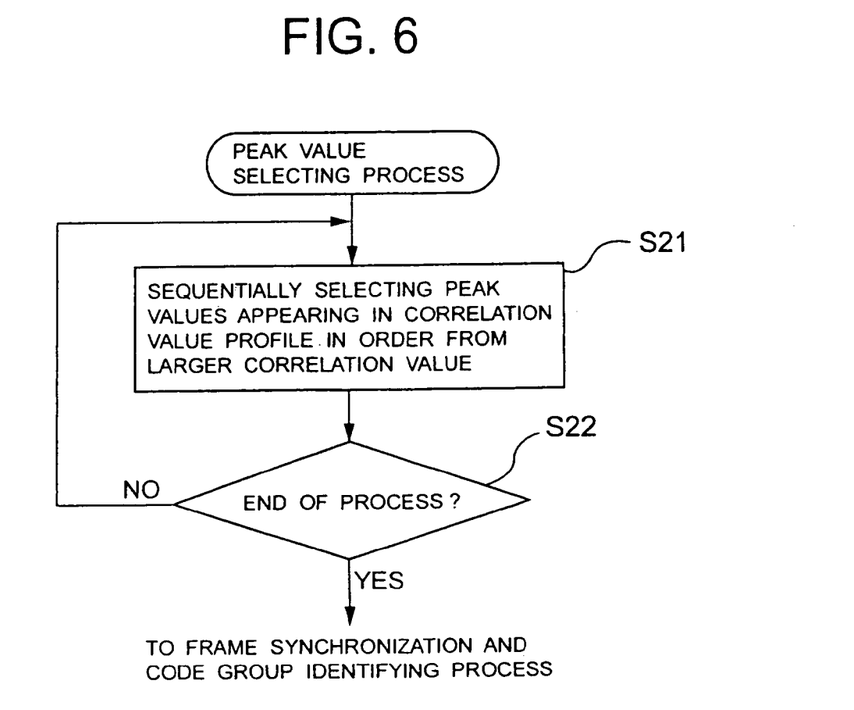
FIG. 6 is a flowchart of an example of the conventional peak value selecting process.
Figure 8:
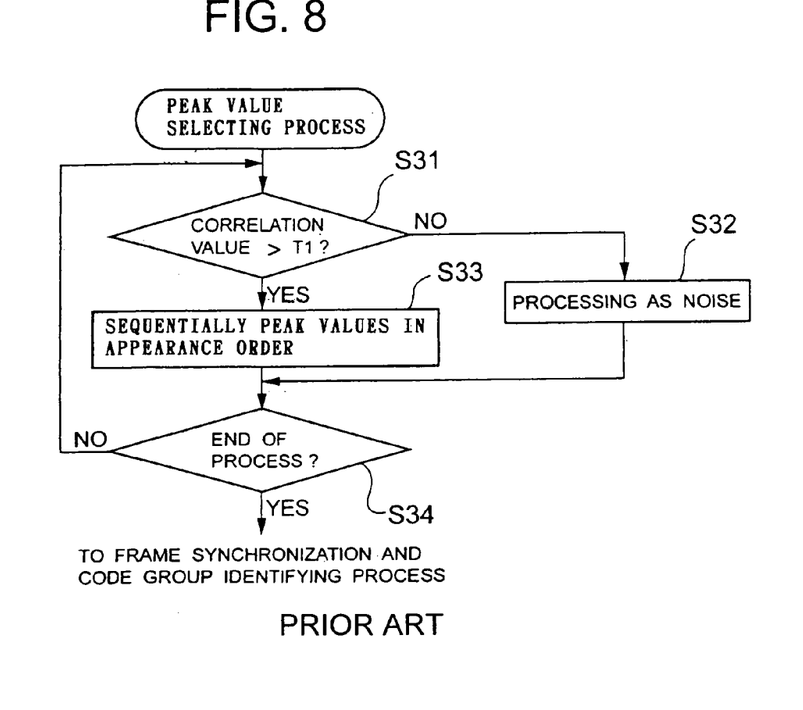
FIG. 8 is a flowchart of another example of the conventional peak value selecting process.

If a plurality of base stations are detected by this method, either the processing method shown in FIG. 6 or the processing method shown in FIG. 8 can be used to select a plurality of peak values from the correlation value profile obtained in step #1.

Figure 7:
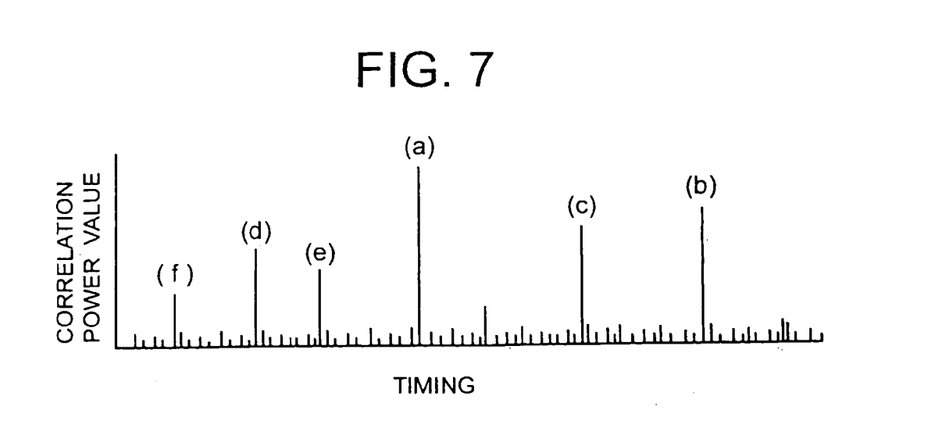
FIG. 7 is a view for explaining the order of selecting a peak value shown in FIG. 6.

In the case of the processing method shown in FIG. 6, the peak value in the correlation value profile having a larger correlation power value is selected (steps S21 to S22 in FIG. 6), and the processes in and after step #2 are sequentially performed. For example, when the correlation value profile as shown in profile as shown in FIG. 7 is obtained, then the processes in and after step #2 are performed in the order of (a)→(b) →(c)→(d)→(e)→(f).

Figure 9:
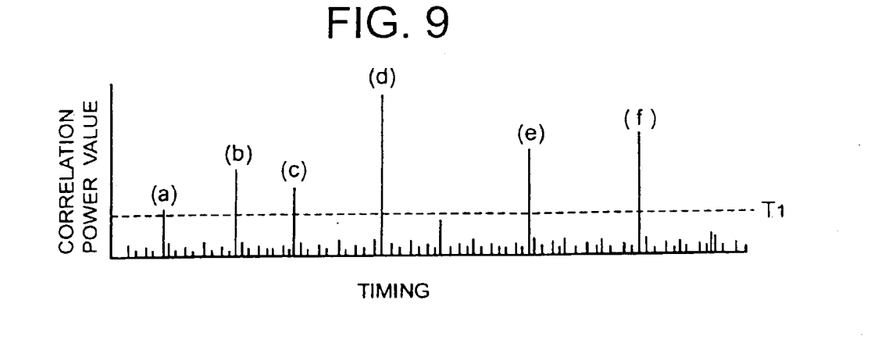
FIG. 9 shows the order of selecting a peak value shown in FIG. 8.

When the processing method shown in FIG. 8 is performed, a threshold T1 is set for the power value of the correlation value profile, the correlation power value equal to or smaller than the threshold T1 is processed as noise (steps S31 and S32 shown in FIG. 8), the correlation power value larger than the threshold T1 is selected in the order of the occurrence of a peak value (steps S31, S33, and S34 shown in step S8), and the processes in and after step #2 are sequentially performed. For example, when the correlation value profile as shown in FIG. 9 is obtained, then the processes in and after step #2 are performed in the order of (a)→(b)→(c)→(d)→(e)→(f).

Figure 10:
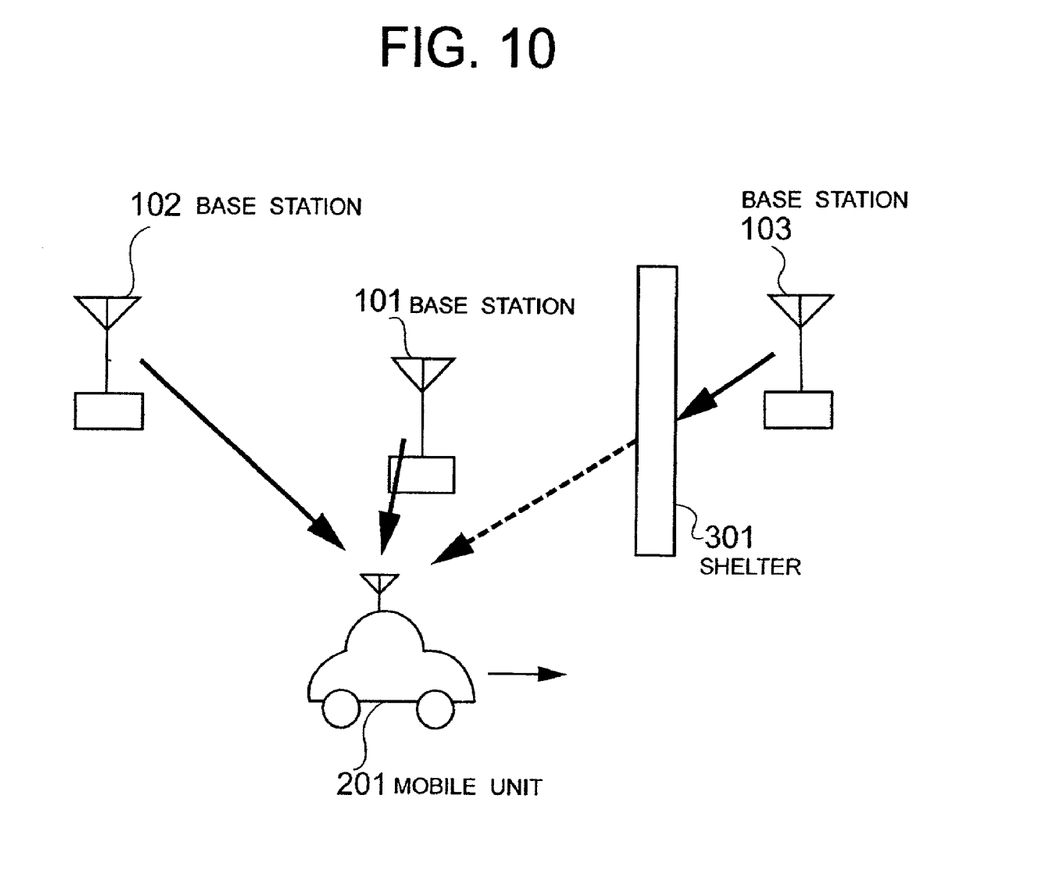
FIG. 10 shows the problem with the conventional peak value selecting process.

In the above mentioned conventional CDMA mobile communications, the environment as shown in FIG. 10 is assumed. If a mobile unit (mobile object provided with a mobile unit) 201 is moved in the right direction in FIG. 10, and if a shelter 301 exists between a base station 103 and the mobile unit 201, then the electric wave from base stations 101 and 102 can be predicted and therefore transmitted or received by the mobile unit 201 with sufficiently strong power. However, the waves from the base station 103 are reduced by the shelter 301 and received by the mobile unit 201 with lower power than the base stations 101 and 102.

When the mobile unit 201 starts detecting the base stations 101 to 103 in the above mentioned method in the state shown in FIG. 10, then the order in which the base stations 101 to 103 are detected is not certain in the processing method shown in FIG. 8. However, in the processing method shown in FIG. 6, the probability that the base station 103 can be detected is clearly lower.

Figure 11:
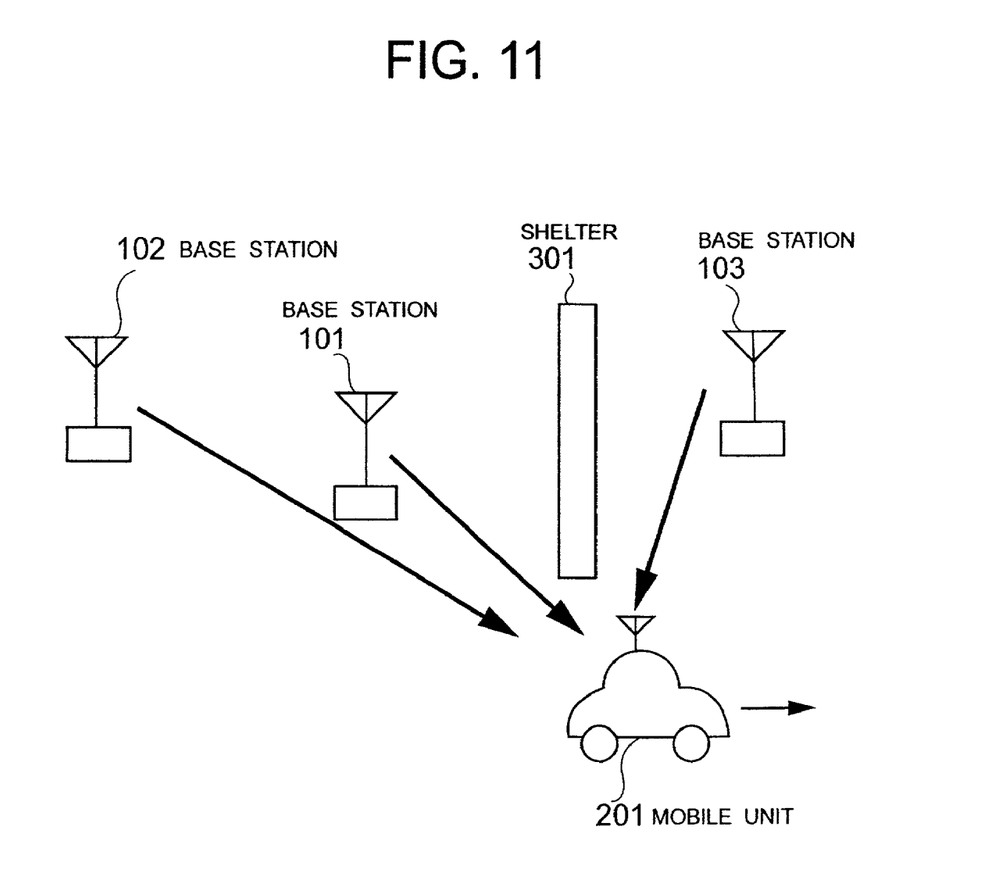
FIG. 11 shows the problem with the conventional peak value selecting process.

Furthermore, in the state shown in FIG. 10, if the mobile unit 201 starts communications with the base station 101, some time has passed, and if the state shown in FIG. 11 is entered, no influence of the shelter 301 is detected any more. When the most appropriate base station to the mobile unit 201 is the base station 103 as a connection partner, the mobile unit 201 performs hand-over from the base station 101 to the base station 103.

However, if the mobile unit 201 cannot detect the base station 103 in the order of detecting base stations, it cannot perform the hand-over, and the electric wave from the base station 101 becomes weaker, thereby disconnecting the communications between the mobile unit 201 and the base station 101.

SUMMARY OF THE INVENTION

The present invention aims at solving the above mentioned problems, and providing a CDMA mobile communications apparatus capable of enhancing the probability of detecting a base station with low power, and a base station detecting method used for the apparatus.

The CDMA mobile communications apparatus according to the present invention has the function of detecting a base station which is a direct connection partner by synchronizing the base station at slot timing and frame timing in this order by stepwise detecting a physical channel for constant transmission from the base station, and by identifying a Scrambling Code used in the base station, and includes: first selection means for selecting noise and significant slot timing for a peak correlation value at which the slot timing synchronization is performed; and second selection means for selecting a relatively large correlation value and a relatively small correlation value for the selected significant slot timing, in which the relatively large correlation value and the relatively small correlation value are appropriately selected at an optional ratio to synchronize the frame timing and identify the Scrambling Code.

The base station detecting method for the CDMA mobile communications apparatus according to the present invention has the function of detecting a base station which is a direct connection partner by synchronizing the base station at slot timing and frame timing in this order by stepwise detecting a physical channel for constant transmission from the base station, and by identifying a Scrambling Code used in the base station, and includes: a first step of selecting noise and significant slot timing for a peak correlation value at which the slot timing synchronization is performed; and a second step of selecting a relatively large correlation value and a relatively small correlation value for the selected significant slot timing, in which the relatively large correlation value and the relatively small correlation value are appropriately selected at an optional ratio to synchronize the frame timing and identify the Scrambling Code.

That is, the CDMA mobile communications apparatus according to the present invention intentionally selects a peak having a small correlation power value at a certain rate when a peak value is selected in the process in and after the step of 'frame synchronization/code group identification' from the correlation value profile obtained in the step of 'slot synchronization' in the 3-stage process of detecting a base station having three steps of 'slot synchronization', 'frame synchronization/code group identification', and 'Scrambling Code identification'.

To be more practical, when a peak value in performing the processes in and after the step of 'frame synchronization/code group identification' in the 3-stage process of detecting a base station is to be selected, the CDMA mobile communications apparatus according to the present invention selects noise and a significant correlation value based on the first threshold T1, selects a peak value larger than a second threshold T2 and a peak correlation value equal to or smaller than the second threshold T2 based on the second threshold T2 set between the largest peak correlation value and the first threshold T1 for the selected significant correlation value, holds the slot timing corresponding to each peak correlation value in the first and second storage units, and selects probable slot timing alternately from the first and second storage units.

Thereby, it is possible to intentionally select a peak having a correlation power value smaller than other peaks at a certain rate, and the probability of detecting a base station received with low power can be enhanced by performing at an earlier stage the processes in and after the step of 'frame synchronization/code group identification' on the probable slot timing detected with low correlation power value when a correlation value profile is obtained.

DESCRIPTION OF THE PREFERRED EMBODIMENT

Figure 1:
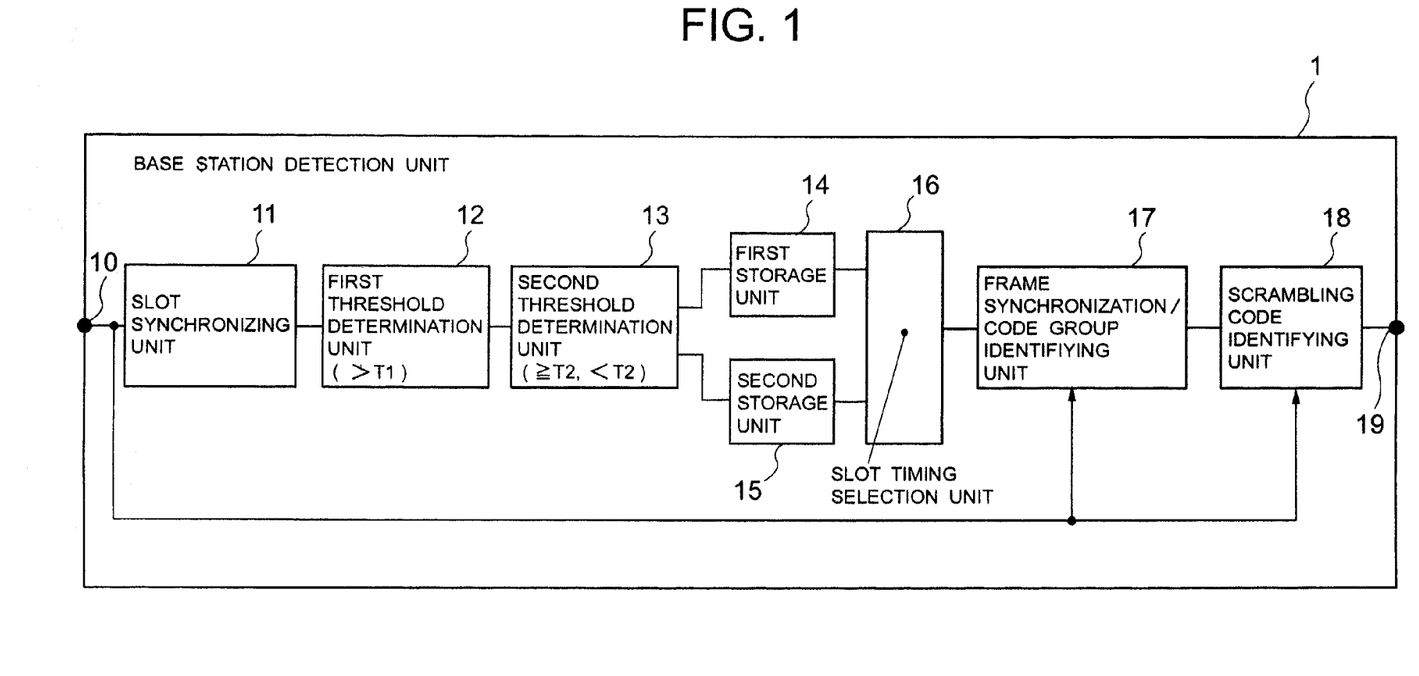
FIG. 1 is a block diagram of a configuration of a base station detection unit of a CDMA mobile communications apparatus according to an embodiment of the present invention.

An embodiment of the present invention will be described below by referring to the attached drawings. FIG. 1 is a block diagram of a configuration of a base station detection unit of a CDMA mobile communications apparatus according to an embodiment of the present invention. In FIG. 1, a base station detection unit 1 comprises an input unit 10, a slot synchronizing unit 11, a first threshold determination unit 12, a second threshold determination unit 13, a first storage unit 14, a second storage unit 15, a slot timing selection unit 16, a frame synchronization/code group identifying unit 17, a Scrambling Code identifying unit 18, and an output unit 19.

The slot synchronizing unit 11 is a digital matched filter having a spread code PSC (Primary Synchronization Code) as a filter coefficient, and performs a correlation operation at a chip rate, or an integral multiple of the chip rate on a reception base band signal input from the input unit 10 in the CDMA mobile communications apparatus (hereinafter referred to as a mobile unit) (not shown in the attached drawings).

The first threshold determination unit 12 selects a peak correlation value output from the slot synchronizing unit 11 based on the predetermined first threshold T1. The second threshold determination unit 13 selects a peak correlation value selected by the first threshold determination unit 12 based on the predetermined first threshold T1. The first storage unit 14 and the second storage unit 15 hold the pSCH (Primary Synchronization Channel) timing, that is, the slot timing, corresponding to the peak correlation value selected by the second threshold determination unit 13.

The slot timing selection unit 16 appropriately selects the slot timing held in the first storage unit 14 and the second storage unit 15, and sequentially transmits it to the frame synchronization/code group identifying unit 17 and the Scrambling Code identifying unit 18. The frame synchronization/code group identifying unit 17 performs a frame synchronization/code group identifying process on the slot timing and received base band signal sequentially transmitted from the slot timing selection unit 16, and the Scrambling Code identifying unit 18 performs a Scrambling Code identifying process on a process result of the frame synchronization/code group identifying unit 17 and the received baseband signal.

Figure 2:
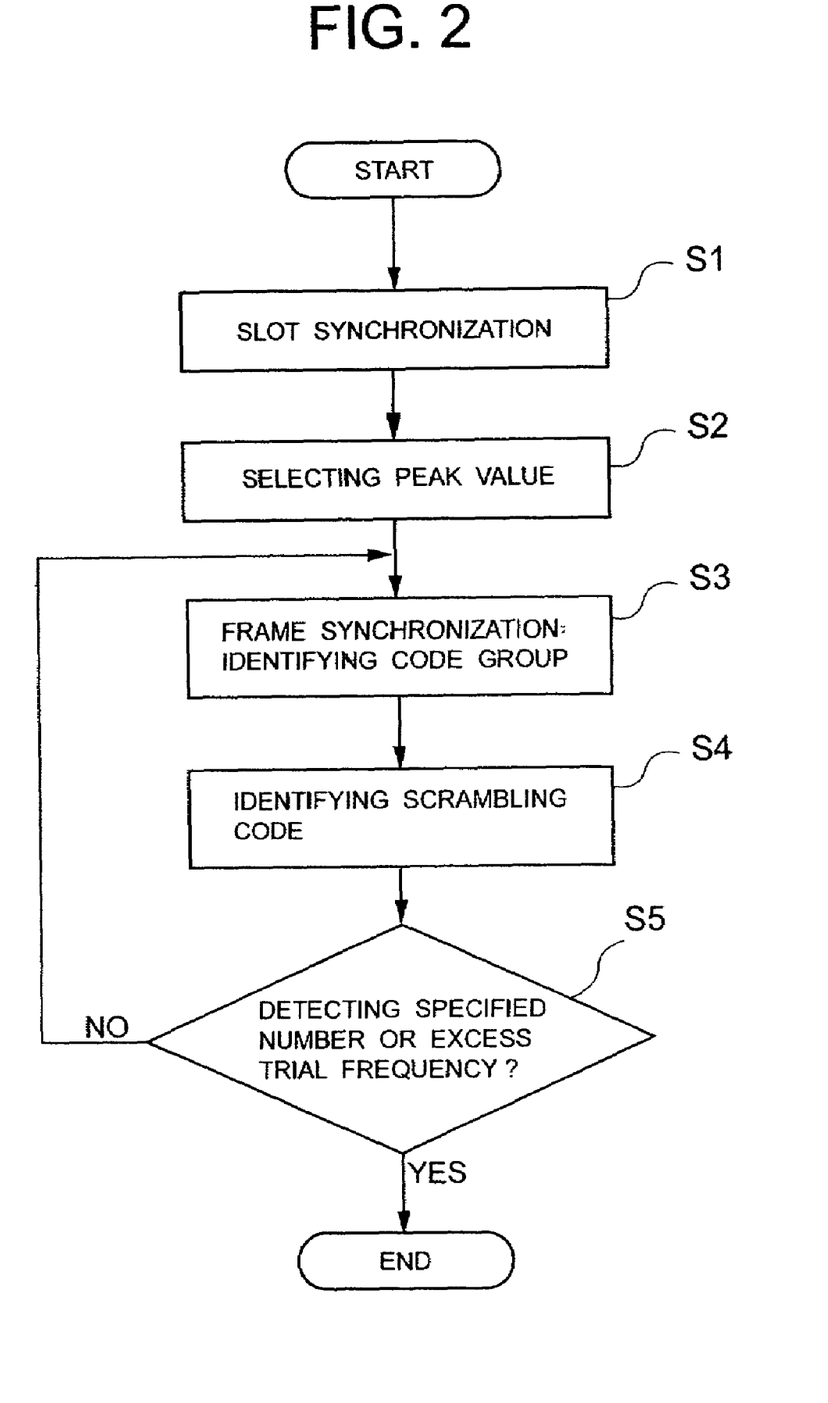
FIG. 2 is a flowchart of a base station detecting process in the base station detection unit shown in FIG. 1.

FIG. 2 is a flowchart of the base station detecting process in the base station detection unit 1 shown in FIG. 1. The base station detecting process according to an embodiment of the present invention is described below by referring to FIGS. 1 and 2.

In the present embodiment, the CDMA mobile communications apparatus detects a base station not shown in the attached drawings in the base station detecting method (described in the standard specification TS25.214) using the three physical channels of the pSCH, the sSCH (Secondary Synchronization Channel), and the CPICH (Common Pilot Channel).

In the base station detection, the frame transmission timing of a base station is detected with the chip precision, that is, a spread unit, and the Scrambling Code used in the base station is detected in the three steps of 'slot synchronization', 'frame synchronization/code group identification', and 'Scrambling Code identification'.

First, in the 'slot synchronization' step (hereinafter referred to as step #1), the slot synchronizing unit 11 performs a correlation operation on a spread code PSC at the entire chip timing in one slot period, and obtains the profile of a correlation power value for the timing (step S1 shown in FIG. 2).

When the pSCH transmission timing of the base station matches the timing of the correlation operation on the mobile unit side, a large correlation value appears in the profile. In general, a digital matched filter having a spread code PSC as a filter coefficient is used in the correlation operation.

When a received baseband signal of the mobile unit is input into the matched filter, a sharp peak is output at the timing of the pSCH matching the filter coefficient. By detecting the peak, the transmission timing of the pSCH, that is, the slot timing, can be synchronized.

Successively, the peak value (slot timing synchronized in step S1) output from the slot synchronizing unit 11 is selected by the first threshold determination unit 12, the second threshold determination unit 13, the first storage unit 14, second storage unit 15, and the slot timing selection unit 16 (step S2 shown in FIG. 2).

In the step of 'frame synchronization/code group identification' (hereinafter referred to as step #2), the frame synchronization/code group identifying unit 17 performs the correlation operation on the 16 types of SSC (Secondary Synchronization Code) at the slot timing selected in the prior step.

The frame synchronization/code group identifying unit 17 obtains each SSC correlation value over a plurality of slots, accumulates the correlation values in the 64 SSC sequence, and identifies code groups in order from the highest accumulation value (step S3 shown in FIG. 2). Furthermore, the frame synchronization can be realized in the SSC sequence.

In the step of 'Scrambling Code identification'(hereinafter referred to as step #3), the Scrambling Code identifying unit 18 performs correlation operations on the eight Scrambling Codes belonging to the code groups identified in step #2 at the frame timing synchronized in step #2, and identifies Scrambling Codes in order from the highest correlation value (step S4 in FIG. 2).

In this state, when transmission signals of a plurality of base stations are received by a mobile unit at different timing, a plurality of peaks appear depending on the timing and reception power in the correlation value profile obtained in step #1. Therefore, a plurality of base stations can be detected by repeating the processes in steps #2 and #3 (steps S3 to S5 shown in FIG. 2) on the plurality of peaks obtained in step #1.

Figure 3:
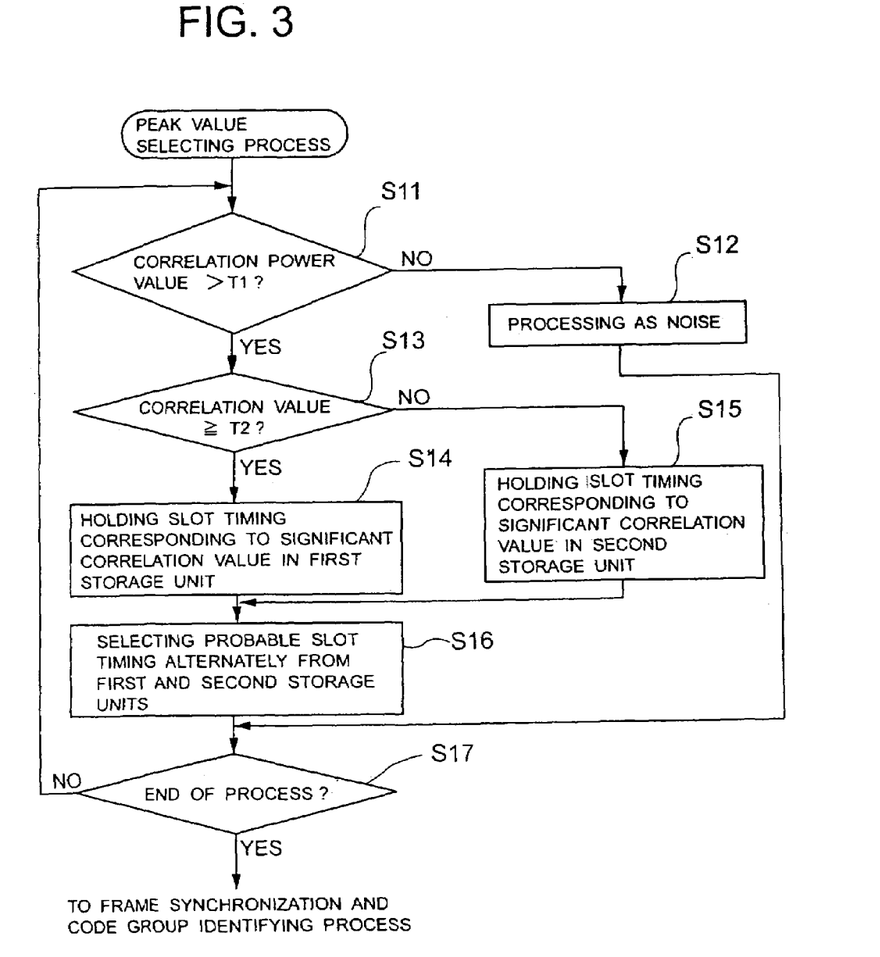
FIG. 3 is a flowchart of a peak value selecting process according to an embodiment of the present invention.
Figure 4:
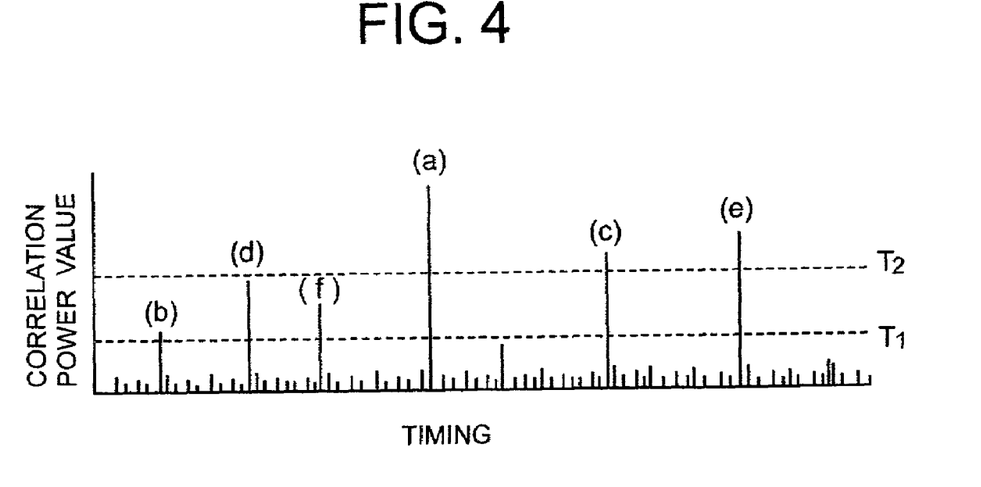
FIG. 4 is a view showing an order of selecting a peak value according to an embodiment of the present invention.

FIG. 3 is a flowchart of the peak value selecting process according to an embodiment of the present invention. FIG. 4 shows the order of selecting peak values according to an embodiment of the present invention. The base station detecting process according to an embodiment of the present invention will be practically described below by referring to FIGS. 1, 3, and 4.

The slot synchronizing unit 11 is a digital matched filter having a spread code PSC as a filter coefficient for the slot synchronizing process, and performs a correlation operation at a chip rate, or an integral multiple of the chip rate on a reception base band signal in the mobile unit input from the input unit 10. A correlation power value as shown in FIG. 4 is output in time series from the slot synchronizing unit 11.

On the other hand, the first threshold determination unit 12 selects noise and a significant correlation value using the first threshold T1 (step S11 shown in FIG. 3), and inputs the significant correlation value and the corresponding pSCH timing, that is, the slot timing into the second threshold determination unit 13. At this time, the first threshold determination unit 12 processes a correlation value equal to or smaller than the first threshold T1 as noise (step S12 shown in FIG. 3), and processes a correlation value larger than the first threshold T1 as a significant correlation value.

The second threshold determination selects a peak correlation value larger than or equal to the second threshold T2 and a peak correlation value smaller than the second threshold T2 based on the second threshold T2 set between the largest peak correlation value and the first threshold T1 (step S13 shown in FIG. 3), and holds the slot timing for each peak correlation value in the first and second storage units 14 and 15 (steps S14 and S15 shown in FIG. 3).

In the example shown in FIG. 4, the slot timing corresponding to the peak correlation values (a), (c), and (e) is held in the first storage unit 14, and the slot timing corresponding to the peak correlation values (b), (d), and (f) is held in the second storage unit 15.

Then, the following slot timing selection unit 16 selects probable slot timing alternately from the first and second storage units 14 and 15 (steps S16 and S17 shown in FIG. 3), and a base station can be detected through the processes in the frame synchronization/code group identifying unit 17 and the Scrambling Code identifying unit 18.

In the peak value selecting process according to an embodiment of the present invention, the order of detecting a base station in an example shown in FIG. 4 is (a)→(b)→(c)→(d)→(e)→(f).

Thus, when a peak value in performing the processes in and after step #2 is selected from the correlation value profile obtained in step#1 in the 3-stage base station detecting process, a peak having a correlation power value smaller than other peaks is intentionally selected at a certain rate in the above mentioned method, the processes in steps #2 and #3 are performed at an early stage on the slot timing detected with a small correlation power value when the correlation value profile is obtained in step #1, thereby enhancing the detection probability of a base station received with low power.

In the present embodiment, the slot timing selection unit 16 selects probable slot timing alternately from the first and second storage units 14 and 15, but it is also possible to select the correlation values held in the first and second storage units 14 and 15 in order from the largest or smallest value. In this case, the order of detecting a base station in an example shown in FIG. 4 is (a)→(d)→(e)→(f)→(c)→(b).

As described above, according to the present invention, the CDMA mobile communications apparatus having the function of detecting a base station which is a direct connection partner by synchronizing the base station at slot timing and frame timing in this order by stepwise detecting a physical channel for constant transmission from the base station, and by identifying a Scrambling Code used in the base station, selects noise and significant slot timing for a peak correlation value at which the slot timing synchronization is performed, and selects a relatively large correlation value and a relatively small correlation value for the selected significant slot timing, wherein the relatively large correlation value and the relatively small correlation value are appropriately selected at an optional ratio to synchronize the frame timing and identify the Scrambling Code, thereby enhancing the detection probability of a base station received with low power.

What is claimed is:

1. A CDMA mobile communications apparatus having a function of detecting a plurality of base stations which are possible direct connection partners by synchronizing each of the base stations at slot timing and frame timing in this order by stepwise detecting a physical channel for constant transmission from the base station, and by identifying a Scrambling Code used in the base station, comprising:
a first selection unit that selects between noise and a significant slot timing for a peak correlation value at which the slot timing synchronization is performed for each of the plurality of base stations; and
a second selection unit that selects a relatively large correlation value and a relatively small correlation value for the selected significant slot timings selected by the first selection unit,
wherein said relatively large correlation value and relatively small correlation value are appropriately selected at an optimal ratio to synchronize the frame timing and identify the Scrambling Code used in a base station, and
wherein the relatively large correlation value and the relatively small correlation value are alternately selected to synchronize the frame timings and identify the Scrambling Codes of the plurality of base stations, respectively.

2. The CDMA mobile communication apparatus according to claim 1,
wherein said physical channel comprises a pSCH (Primary Synchronization Channel), an sSCH (Secondary Synchronization Channel), and a CPICH (Common Pilot Channel).

3. The CDMA mobile communication apparatus according to claim 2,
wherein the plurality of base stations can be detected by repeatedly detecting the sSCH and the CPICH at each of a plurality of slot timing processes selected by said first and second selection units.

4. The CDMA mobile communication apparatus according to claim 1,
wherein said first selection unit is configured such that the noise and the significant slot timing are selected based on a first threshold predetermined for a peak correlation value at which the slot timing synchronization is performed.

5. The CDMA mobile communication apparatus according to claim 4,
wherein said second selection unit is configured such that the relatively large correlation value and the relatively small correlation value can be selected based on a second threshold predetermined for a significant slot timing selected by said first selection unit.

6. The CDMA mobile communication apparatus according to claim 1,
wherein said relatively large correlation value and said relatively small correlation value are selected from a group of large correlation values and small correlation values, respectively, wherein selection in each group is performed in order from the largest value.

7. The CDMA mobile communication apparatus, having a function of detecting a base station which is a direct connection partner by synchronizing the base station at slot timing and frame timing in this order by stepwise detecting a physical channel for constant transmission from the base station, and by identifying a Scrambling Code used in the base station, comprising:
first selection means for selecting noise and effective slot timing for a peak correlation value at which the slot timing synchronization is performed; and
second selection means for selecting a relatively large correlation value and a relatively small correlation value for the selected significant slot timing,
wherein said relatively large correlation value and said relatively small correlation value are appropriately selected at an optimal ratio to synchronize the frame timing and identify the Scrambling Code, and
wherein said relatively large correlation value and said relatively small correlation value are alternately selected to synchronize the frame timing and identify the Scrambling Code.

8. A base station detecting method for use with a CDMA mobile communications apparatus having a function of detecting a plurality of base stations which are possible direct connection partners by synchronizing each of the base stations at slot timing and frame timing in this order by stepwise detecting a physical channel for constant transmission from the base station, and by identifying a Scrambling Code used in the base station, comprising:
- a first step of selecting noise and significant slot timing for a peak correlation value at which the slot timing synchronization is performed for each of the plurality of base stations; and
- a second step of selecting a relatively large correlation value and a relatively small correlation value for the selected significant slot timings,
- wherein said relatively large correlation value and said relatively small correlation value are appropriately selected at an optimal ratio to synchronize the frame timing and identify the Scrambling Code used in a base station, and
- wherein the relatively large correlation value and the relatively small correlation value are alternately selected to synchronize the frame timings and identify the Scrambling Codes used by the plurality of base stations, respectively.

9. The base station detecting method according to claim 8, wherein said physical channel comprises a pSCH (Primary Synchronization Channel), an sSCH (Secondary Synchronization Channel), and a CPICH (Common Pilot Channel).

10. The base station detecting method according to claim 9, wherein the plurality of base stations can be detected by repeatedly detecting the sSCH and the CPICH at each of a plurality of slot timing processes selected in said first and second selecting steps.

11. The base station detecting method according to claim 8, wherein said first step is configured such that the noise and the significant slot timing are selected based on a first threshold predetermined for a peak correlation value at which the slot timing synchronization is performed.

12. The base station detecting method according to claim 11, wherein said second step is configured such that the relatively large correlation value and the relatively small correlation value can be selected based on a second threshold predetermined for a significant slot timing selected by said first step.

13. The base station detecting method according to claim 8, wherein said relatively large correlation value and said relatively small correlation value are selected from a group of large correlation values and a group of small correlation values, respectively, wherein selection in each group is performed in order from the largest value.

* * * * *